(12) United States Patent
Hampp-Bahnmueller et al.

(10) Patent No.: US 12,380,074 B2
(45) Date of Patent: Aug. 5, 2025

(54) OPTIMIZING METADATA ENRICHMENT OF DATA ASSETS

(71) Applicant: International Business Machines Corporation, Armonk, NY (US)

(72) Inventors: Thomas Hampp-Bahnmueller, Stuttgart (DE); Peter Gerstl, Holzgerlingen (DE); Yannick Saillet, Stuttgart (DE); Michael Baessler, Bempflingen (DE); Albert Maier, Tuebingen (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 18/149,882

(22) Filed: Jan. 4, 2023

(65) Prior Publication Data
US 2024/0152494 A1    May 9, 2024

(30) Foreign Application Priority Data
Nov. 9, 2022 (GB) .................................. 2216661

(51) Int. Cl.
*G06F 16/215* (2019.01)
*G06F 16/22* (2019.01)
(Continued)

(52) U.S. Cl.
CPC .......... *G06F 16/215* (2019.01); *G06F 16/221* (2019.01); *G06F 16/285* (2019.01); *G06F 16/907* (2019.01)

(58) Field of Classification Search
CPC ... G06F 16/215; G06F 16/285; G06F 16/2365
See application file for complete search history.

(56) References Cited

U.S. PATENT DOCUMENTS

| | | | |
|---|---|---|---|
| 7,620,633 B1 * | 11/2009 | Parsons | G06F 16/907 |
| | | | 715/788 |
| 2008/0109482 A1 * | 5/2008 | Macchletti | G06F 16/164 |

(Continued)

OTHER PUBLICATIONS

"Database Table/Column rules", Stack Exchange, Printed Dec. 20, 2022, 7 pages, <https://dba.stackexchange.com/questions/248923/database-table-column-rules>.

(Continued)

*Primary Examiner* — Apu M Mofiz
*Assistant Examiner* — Farhad Agharahimi
(74) *Attorney, Agent, or Firm* — Edward J. Wixted, III

(57) ABSTRACT

The present disclosure relates to a method of metadata enrichment using an enrichment comprising multiple steps. The method comprises: determining for an input data asset a metadata value descriptive of the input data asset. Characteristics of the metadata value of the input data asset may be determined. At least one informativeness score of the metadata value of the input data asset may be computed using the determined characteristics. An execution of the enrichment step may be skipped in case an input characteristic of the enrichment step is not part of the determined characteristics. In case the input characteristic of the enrichment step is part of the determined characteristics, the enrichment step may be adapted and executed or the enrichment step may be executed without adaptation. Labels resulting from the executed enrichment steps may be combined for providing one or more labels of the data asset.

19 Claims, 5 Drawing Sheets

(51) Int. Cl.
*G06F 16/28* (2019.01)
*G06F 16/907* (2019.01)

(56) References Cited

U.S. PATENT DOCUMENTS

| | | |
|---|---|---|
| 2010/0106558 A1 | 4/2010 | Li |
| 2020/0302122 A1 | 9/2020 | Lai |
| 2022/0058658 A1 | 2/2022 | Herrera |

OTHER PUBLICATIONS

Razmadze et al. "Selecting Sub-tables for Data Exploration", Cornell University, ArXiv 2203.02754v, Mar. 5, 2022, 13 pages, <https://arxiv.org/pdf/2203.02754.pdf>.

Drkusic, Emil, "Learn SQL: Naming Conventions", SQLShack, Jul. 28, 2020, 10 pages, <https://www.sqlshack.com/learn-sql-naming-conventions/>.

Saillet, Yannick, "How to quantify Data Quality?", Towards Data Science, Nov. 2, 2020, 14 pages, <https://towardsdatascience.com/how-to-quantify-data-quality-743721bdba03>.

\* cited by examiner

OPTIMIZING METADATA ENRICHMENT OF DATA ASSETS

BACKGROUND

The present invention relates to the field of digital computer systems, and more specifically, to a method for metadata enrichment of data assets.

When dealing with data stored in a variety of repositories, it is desirable to understand what analysis quality level can be expected when analyzing the data. Such insight can help to understand the effectiveness of an analysis or to plan an approach to most efficiently analyze the data in these repositories. An example of such analysis is the tagging or classification of technical assets with information as part of metadata enrichment. A challenge for such tagging analysis is to assess the quality and reliability of the association between the tagged asset and the tag.

SUMMARY

Various embodiments provide a method for metadata enrichment, computer program product and system as described by the subject matter of the independent claims. Advantageous embodiments are described in the dependent claims. Embodiments of the present invention can be freely combined with each other if they are not mutually exclusive.

In one aspect, the invention relates to a method for metadata enrichment using an enrichment comprising multiple steps. The method comprises: determining for an input data asset a metadata value descriptive of the input data asset; determining characteristics of the metadata value of the input data asset; computing at least one informativeness score of the metadata value of the input data asset using the determined characteristics; determining input characteristics of the enrichment steps; for each step of the enrichment steps: determining whether the input characteristic of the enrichment step is part of the determined characteristics; skipping an execution of the enrichment step in case the input characteristic of the enrichment step is not part of the determined characteristics; in case the input characteristic of the enrichment step is part of the determined characteristics, performing based on the at least one informativeness score at least one of the following: adapting the enrichment step according to the input characteristic and executing the adapted enrichment step using as input the input characteristic; or executing the enrichment step using as input the input characteristic; combining labels resulting from the executed enrichment steps for providing one or more labels of the data asset.

In one aspect the invention relates to a computer program product comprising a computer-readable storage medium having computer-readable program code embodied therewith, the computer-readable program code configured to implement the method of the above embodiment.

In one aspect the invention relates to a computer system for metadata enrichment using an enrichment comprising multiple steps. The computer system is configured for: determining for an input data asset a metadata value descriptive of the input data asset; determining characteristics of the metadata value of the input data asset; computing at least one informativeness score of the metadata value of the input data asset using the determined characteristics; determining input characteristics of the enrichment steps; for each step of the enrichment steps: determining whether the input characteristic of the enrichment step is part of the determined characteristics; skipping an execution of the enrichment step in case the input characteristic of the enrichment step is not part of the determined characteristics; in case the input characteristic of the enrichment step is part of the determined characteristics, performing based on the at least one informativeness score at least one of the following: adapting the enrichment step according to the input characteristic and executing the adapted enrichment step using as input the input characteristic; or executing the enrichment step using as input the input characteristic; combining labels resulting from the executed enrichment steps for providing one or more labels of the data asset.

BRIEF DESCRIPTION OF THE DRAWINGS

In the following embodiments of the invention are explained in greater detail, by way of example only, making reference to the drawings in which.

DETAILED DESCRIPTION

Figure 1:
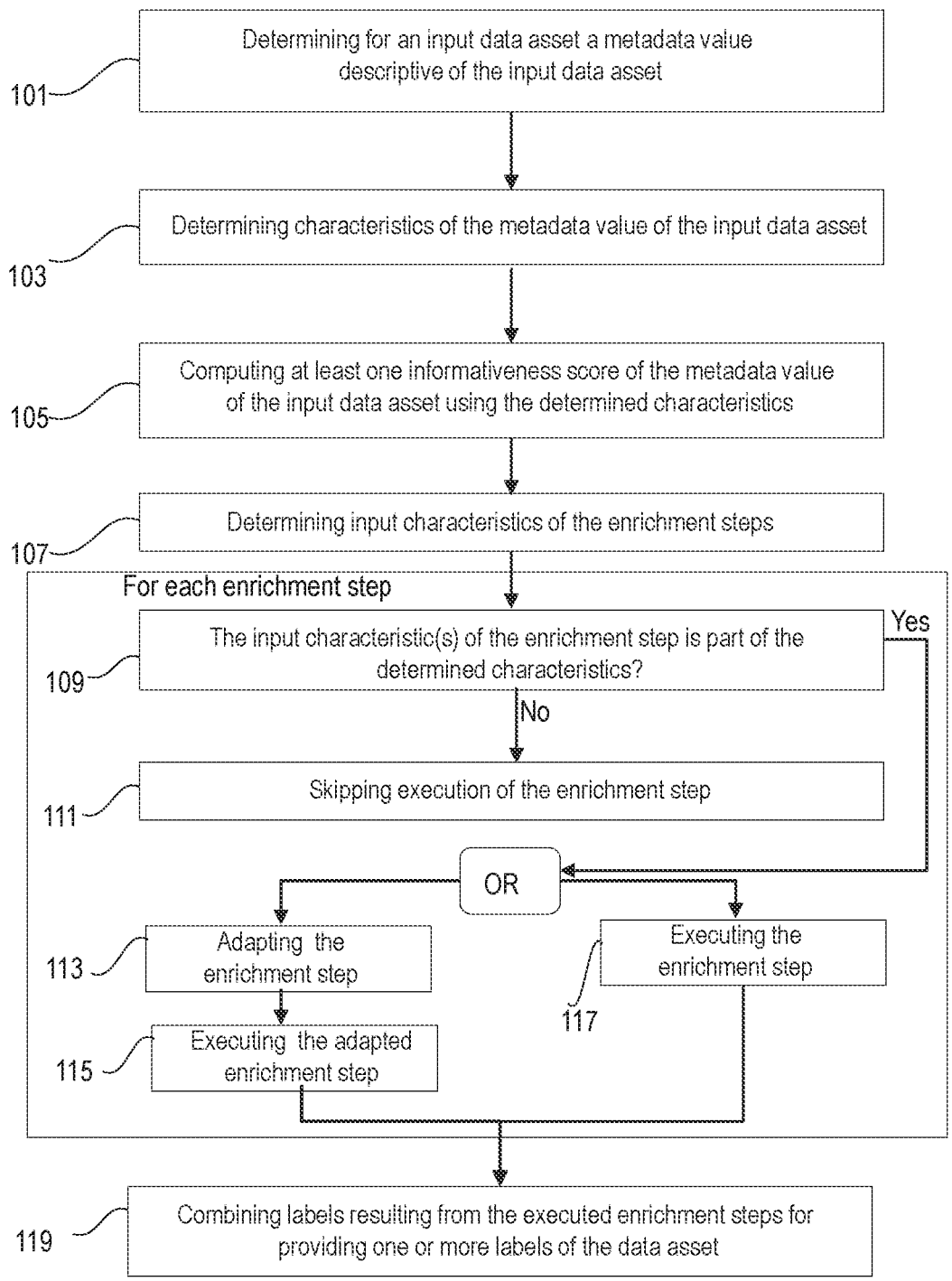
FIG. 1 is a flowchart of a method for metadata enrichment in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Enriching metadata of a data asset may comprise providing additional metadata that further describes the data asset. The data asset may, for example, comprise one or more tables (e.g., of a relational database system) and/or one or more columns of a table and/or one or more files of a file system. The additional metadata may be one or more labels for labelling or tagging or describing the data asset. The additional metadata may, for example, comprise alternative names or terms that describe the data asset. The additional metadata may, for example, be obtained by classification of the data asset with known service-level information. For example, if the data asset is a column of a table, the enrichment of the metadata of the column may be performed by providing a metadata that describes the column using predefined terms known to the skilled person in the art such as terms of a governance catalogue. The present subject matter may enable to optimize metadata enrichment of data assets.

The enriching of the data asset may be performed using a metadata value of the data asset. The metadata of the data asset may, for example, comprise one or more metadata entities. The metadata entity may, for example, be a column name, data type of the column, table name, a description e.g., an abstract, of the data asset, the distinct values of a column etc. The metadata value may comprise the values of the metadata entities. The metadata value of the data asset may further comprise a data class of the data asset. For example, if the metadata entities comprise a column name and a file name, the metadata value may comprise a tuple having three entries having the value of the column name, the value of the file name, and the value of the data class (e.g., the tuple may comprise: {"customer ID", "disclosure.pdf", "Person"}).

The metadata enrichment of a data asset may be performed according to an enrichment workflow. The workflow refers to a defined set of tasks or steps to produce a final outcome. The final outcome of the enrichment workflow may be one or more labels that describe the data asset. The enrichment workflow may, for example, comprise a set of enrichments steps. An enrichment step may, for example, receive as input the metadata value of the data asset and may provide one or more individual labels of the data asset. The individual labels of the set of enrichments steps of the enrichment workflow may be combined in order to provide a final one or more labels of the data asset. The enrichment step may, for example, use as input one or more characteristics, herein named input characteristics, of the metadata value of the data asset in order to determine the respective individual one or more labels. For example, if the metadata value is an abstract describing a table, the input characteristic of the metadata value may be the number of stop words in the abstract. If the metadata value is a column name, the input characteristic of the metadata value may be the length of the name, etc.

Embodiments of the present subject matter may enable enrichment of the metadata of an input data asset. The input data asset is herein named analysis asset for simplification of the description. A metadata value of the analysis asset may be determined using, for example, metadata entities of the analysis asset. The metadata value of the analysis asset may have a set of characteristics, herein named a set of analysis characteristics. The set of analysis characteristics may, for example, comprise at least one of: capitalization of the metadata value, length of the metadata value, language of the metadata value, availability of the metadata value, number of non-stop-words of the metadata value, sequence patterns in the metadata value, prefix or postfix sequences in the metadata value, abbreviations in the metadata value, dictionary words in the metadata value, multi-words in the metadata value, and tokens of the metadata value which are lexicalized. The set of analysis characteristics may be used to compute at least one informativeness score (referred to as $I_S$) of the metadata value of the analysis asset. The at least one informativeness score $I_S$ may indicate the level of information that is provided by the content of the metadata value of the analysis asset. For example, the set of analysis characteristics may be compared against respective reference values, and based on the differences, the at least one informativeness score $I_S$ may be derived. For example, a low individual informativeness score may be assigned to the analysis characteristic representing sequence patterns in names such as "Col1", "Col2" etc. because the same information is repeatedly provided. However, the individual informativeness score may be higher for the name tokens that are lexicalized.

The at least one informativeness score $I_S$ may advantageously be used according to the present subject matter to improve the metadata enrichment of the analysis asset. For example, for each enrichment step of the enrichment workflow, the present subject matter may determine based on the at least one informativeness score $I_S$ whether to skip the execution of the enrichment step, adapt the enrichment step before executing the resulting adapted enrichment step, or execute the enrichment step without adapting it. Thus, the present subject matter may avoid a situation where enrichment steps produce a low quality output because they do not take into account the low (or otherwise unusual) informative content of the input characteristic they are presented with. Embodiments of the present subject matter may detect such low informativeness and may execute the enrichment steps accordingly. For example, if the informativeness score is low, this may indicate that the input characteristic of an enrichment step may not be suitable and applying analytics to it may likely produce unreliable output. Embodiments of the present subject matter may not depend on the mechanism which performs the metadata analysis but depend on the nature of input data like names and descriptions for the entities that are found in repositories such as columns, tables, files, or folders. Without embodiments of the present subject matter, knowledge analysis tools might be applied blindly potentially incurring high costs due to misguided decisions based on the final labels provided for the asset.

The execution of an enrichment step may be skipped if at least one input characteristic of the enrichment step is not part of the set of analysis characteristics. If all input characteristics of the enrichment step are part of the set of analysis characteristics, the enrichment step may be adapted, or not adapted, depending on the at least one informativeness score $I_S$. If the enrichment step is adapted, the adapted enrichment step may be executed. If the enrichment step is not adapted, the enrichment step may be executed. The enrichment steps of the enrichment workflow may, for example, be executed sequentially following an order of the enrichment steps. This may particularly be advantageous if the result of one enrichment step is used by a subsequent enrichment step. Alternatively, the enrichment steps may be executed in parallel. This may particularly be advantageous if the enrichment steps are independent of each other.

The execution of each enrichment step may result in or more labels for the analysis asset. The label may be a value of a metadata entity of the analysis asset. For example, if the metadata value of the analysis asset is a column name like "client", the enrichment step may provide "buyer" and "purchaser" as labels for the analysis asset. The labels may enrich the metadata value "client" as they provide alternatives or more specific definitions of the data in the column. After executing the enrichment workflow, the labels that result from the execution of the enrichment steps may be combined to obtain one or more final labels of the analysis asset. For example, all the labels of the enrichment steps may be provided as labels for the analysis asset. In another example, a comparison between the labels of the enrichment steps may be performed and based on the comparison results, a subset of the labels may be selected and provided as final labels for the analysis asset. Following the above example, the enrichment steps may result in the following set of labels: "buyer", "purchaser", "customer", "patient", "user" etc. The final labels may, for example, be selected among this set of labels based on the similarity between the set of labels, e.g., only most dissimilar labels such as "customer," "patient," and "user" may be selected as the final labels of the analysis asset.

Each enrichment step of the enrichment workflow may use a respective assignment algorithm. The assignment algorithm may receive as input the metadata value of the analysis asset and may provide one or more labels that describe the analysis asset. In addition, the assignment algorithm may provide or estimate for each label a confidence level indicating the confidence that the label represents the analysis asset. The assignment algorithm may, for example, comprise a linguistic name matching algorithm which bases its result on the similarity between the provided label and the metadata value such as the name of the analysis asset. The assignment algorithm may, for example, comprise a class-based assignment algorithm that generates labels based on data classification. For example, if a data class is linked to one or more terms, these terms may be suggested or assigned as labels of the analysis asset. The assignment algorithm may, for example, comprise a machine learning (ML) model.

The assignment algorithm may have assignment parameters whose values may enable to perform assignment. The assignment parameters may, for example, comprise a confidence percentage threshold that the label must match in order to be assigned to an asset. The assignment parameters may, for example, comprise the maximum number of label candidates that can be created by assignment and among which the label(s) of the analysis asset are selected. The assignment parameters may, for example, comprise a parameter indicating whether to remove vowels from terms before processing them. Each of the assignment algorithms may compute a respective confidence as a numeric value e.g., between a configurable minimum and one. The minimum value may, for example, be provided as a percentage threshold based on which the associated label is to be suggested or not.

The adaptation or adjustment of the enrichment step may comprise an adaptation of one or more assignment parameters of the assignment algorithm of the enrichment step and/or replacement of the assignment algorithm by another assignment algorithm and/or adaptation of the confidence estimation method. In one example, the adaptation for an enrichment step may comprise an adaptation of the analysis asset used by the enrichment step. For example, the adaptation may comprise a pre-processing of the column and table names of the analysis asset before executing the enrichment step on the adapted asset. For example, using the set of analysis characteristics it may be determined that a common prefix needs to be removed for the pre-processing of the analysis asset to achieve high input quality.

According to one example, the adaptation of the enrichment step is performed in response to determining that the at least one informativeness score $I_S$ does not fulfill a predefined condition. The predefined condition may, for example, require that each score of the at least one informativeness score $I_S$ is higher than a score threshold. In other words, if the metadata value does not provide enough information, the enrichment step may have to be adapted so to prevent inaccurate results.

The computation of the at least one informativeness score $I_S$ may, for example, take advantage of the fact that the analysis asset is named (e.g., table name, column name, folder name, file name) and sometimes also has a description (e.g., as part of database metadata), regardless of the method of generation of the names and the description. For example, there might not be guidelines for the appropriate choice of the asset names and descriptions. This gives asset creators some freedom when choosing names. Names and descriptions may have been created by a database specialist who is familiar with business terminology, or by a technical expert who knows the schema but is not an expert in the whole system. They may provide some meaning to an administrator or database specialist, but their primary intention is not related to the final service provided to the users. Thus, they may mainly serve a technical purpose and in most cases, they are not exposed to line of users. Furthermore, in some cases the technical infrastructure of the repository may impose certain technical restrictions on the selection of an asset name such as length limitations, constraints on codepage or character sets, or on case type. For example, if a name is created programmatically the situation may be worse as the only non-technical restriction may be that names need to be unique within a certain 'name space'. The at least one informativeness score $I_S$ may advantageously be used as an indication of the level of informativeness provided by all these names which are generated in different conditions as describe above.

According to one example, for each analysis characteristic of the set of analysis characteristics, an individual informativeness score may be computed. The individual informativeness score $i_{s_j}^{chr}$ (where j varies between 1 and the number N of analysis characteristics, and chr refers to the fact that the score is defined per analysis characteristic) of a given analysis characteristic is indicative of a difference between the given analysis characteristic and a respective reference characteristic. The at least one informativeness score $I_S$ may, for example, comprise the individual informativeness scores, $I_S=\{i_{s_1}^{chr}, i_{s_2}^{chr}, \ldots, i_{s_N}^{chr}\}$, where $i_{s_1}^{chr}$ is the individual informativeness score determined for the first analysis character of the set of analysis characters, $i_{s_2}^{chr}$ is the individual inforamtiveness score determined for the second analysis character of the set of analysis characters and so on. This may be advantageous as it may enable to control the enrichment on an individual characteristic basis. This may provide accurate results as the characteristics may be treated separately from each other. Alternatively, the at least one informativeness score $I_S$ may be a combination of the individual informativeness scores, as follows $I_S$=comb$(i_{s_1}^{chr}, i_{s_2}^{chr}, \ldots, i_{s_N}^{chr})$, where comb(.) is the function that performs the combination. This may be advantageous as it may provide reliable enrichment results while saving resources for processing every analysis characteristic separately. This may particularly be advantageous in case the number of analysis characteristics is high. comb(.) is a combination function that combines its arguments. The combination function may, for example, compute the average or the median of the individual informativeness scores. This may provide a flexible and controllable method for combining the individual scores.

According to one example, the analysis asset comprises a table having columns. In this case, the metadata value of the table may be descriptive of the column of the table. The metadata value of the column may be, for example, column name, column description, information on creation and usage of the column, data statistics of the column etc. The data statistics may comprise the range of values of the table or column. In this case of the analysis asset being a table, the set of analysis characteristics of the metadata value may comprise the length of the column name, number words in the description, number of stop words in the description, etc. In order to compute the at least one informativeness score $I_S$ of the metadata value of the table using the set of analysis characteristics, the following may be performed. For each column of the table, an individual informativeness score referred to as $i_{s_k}^{clm}$ (where k varies between 1 and the number M of columns of the table, and clm indicates that the score is defined per column) may be computed using the set of analysis characteristics, where $i_{s_1}^{clm}$ is the individual informativeness score determined for the first column of the table, $i_{s_2}^{clm}$ is the individual informativeness score determined for the second column of the table and so on. In one example implementation, each individual informativeness score $i_{s_k}^{clm}$ of a given $k^{th}$ column of the table may be computed using the individual scores of the set of N characteristics of the $k^{th}$ column as described above so that: $i_{s_k}^{clm} = \{i_{s_1}^{chr}, i_{s_2}^{chr}, \ldots, i_{s_N}^{chr}\}_k$, or $i_{s_k}^{clm} = \text{comb}(i_{s_1}^{chr}, i_{s_2}^{chr}, \ldots, i_{s_N}^{chr})_k$, where $\{i_{s_1}^{chr}, i_{s_2}^{chr}, \ldots, i_{s_N}^{chr}\}_k$ are the individual informativeness scores of the set of N analysis characteristics of the $k^{th}$ column respectively.

A confidence score $C_{s_k}^{clm}$ indicating a reliability of the computed individual informativeness score per column may be determined. For example, the M individual informativeness scores $i_{s_1}^{clm}, i_{s_2}^{clm}, \ldots, i_{s_M}^{clm}$ of the columns may be associated with the confidence scores $C_{s_1}^{clm}, C_{s_2}^{clm}, \ldots, C_{s_M}^{clm}$ respectively. All columns of the table having a confidence score above a predefined threshold may be selected. The individual informativeness scores of the selected columns may be combined to obtain a combined informativeness score. Combining the individual informativeness scores may be performed by averaging the individual informativeness scores or by computing a median of the individual informativeness scores. The computed individual informativeness score of each non-selected column of the table may be adapted using the combined informativeness score. Adapting the individual informativeness score of the non-selected column comprises assigning the combined informativeness score to said non-selected column. Alternatively, adapting the individual informativeness score of the non-selected column may comprise computing a weighted sum of the combined informativeness score and the individual informativeness score of the non-selected column and assigning the weighted score to the non-selected column as the individual informativeness score of the non-selected column. Hence, according to this example of the analysis asset being a table, one may provide the at least one informative score $I_S$ as comprising the resulting individual informativeness scores of the columns of the table as follows: $I_S = \{i_{s_1}^{clm}, i_{s_2}^{clm}, \ldots, i_{s_M}^{clm}\}$.

This example may thus enable the use of high confidence columns to adjust informativeness scores for low confidence columns in the table. Indeed, for many columns in a table it may not be possible determine their informativeness with high confidence. But as soon as one or two columns have, with a high confidence value, a high or low informativeness score, the informativeness score may be carried over to the other columns in the table. This may particularly be advantageous for the following reasons. The spectrum from highly informative column metadata to low informative metadata indicates that the highly informative ones may often be carefully curated column names assigned by humans whereas low informative column names may often be automatically assigned based on sequence patterns or application logic. Based on this, it may be assumed that both the high-quality human assignment and the low quality algorithmic/application assignments are typically not done just for one single column in isolation but for the whole table; typically, the whole table may be either highly informative or of low informativeness.

According to one example, the metadata value of the analysis asset comprises names of the columns of the table. The method comprises: for each column name of the column names a set of character n-grams may be computed. An occurrence frequency for each n-gram of the sets of n-grams may be computed. For example, the occurrence frequency for each n-gram of the sets of n-grams may be computed as the percentage of columns of the table in which the n-gram occurs. A variation score $V_s$ may be computed for the table as a combination of the occurrence frequencies over all n-grams in the table. For example, the variation score $V_s$ may be the average occurrence frequency over all n-grams in the table. In one example, the variation score may be combined with the individual informativeness score $i_{s_k}^{clm}$ of each column, thereby obtaining the individual informativeness score of the column e.g., as follows $i_{s_k}^{clm} = \text{comb}(V_s, i_{s_k}^{clm})$. In this case, the at least one informative score $I_S$ may be provided as comprising the resulting individual informativeness scores of the columns of the table, $I_S = \{\text{comb}(V_s, i_{s_1}^{clm}), \text{comb}(V_s, i_{s_2}^{clm}), \ldots, \text{comb}(V_s, i_{s_M}^{clm})\}$. Alternatively, and in case no confidence score $C_{s_1}^{clm}, C_{s_2}^{clm}, \ldots, C_{s_M}^{clm}$ is higher than the threshold, the variation score $V_s$ may be provided as an individual informativeness score of each column of the columns.

According to one example, the metadata value of the data asset comprises names of the columns of the table. The method comprises: comparing the distribution of characters of the column names with a reference distribution of characters. A character score $CHR_s$ may be computed based on the comparison result. The character score may be combined with the individual informativeness score of each column for obtaining the individual informativeness score of the column e.g., as follows $i_{s_k}^{clm} = \text{comb}(CHR_s, i_{s_k}^{clm})$.

In one example, the character score and the variation score may be combined with the individual informativeness score of each column for obtaining the individual informativeness score of the column e.g., as follows $i_{s_k}^{clm} = \text{comb}(V_s, CHR_s, i_{s_k}^{clm})$. Thus, combining these different metrics together in a single score, may provide a score indicating whether the names of a schema, folder or group of assets is likely to have been generated by a computer (in which case it may be useless to try to infer a semantic by comparing those names with real language terms), or if it has been generated by a human (in this case the semantic guess based on the column name may have a chance to produce a good result).

FIG. 1 is a flowchart of a method for metadata enrichment according to an example of the present subject matter. The method may enrich the metadata of a data asset referred to ASS using multiple enrichment steps. Each enrichment step may receive as input one or more input characteristics and may provide in response one or more labels. The multiple enrichment steps may, for example, be steps of a predefined enrichment workflow. The data asset ASS may, for example, comprise one or more tables, one or more columns of a table etc.

A metadata value descriptive of the input data asset ASS may be determined in step 101. In one example, the metadata entities of interest of the data asset ASS may be determined. The metadata entities of interest may, for example, be selected from a predefined list of metadata entities of the data asset ASS. The selection may, for example, be a random selection. Alternatively, the selection may be performed based on a user input that indicates the metadata entities of interest. The metadata entities may, for example, comprise column name, table name, information on creation or usage, data class of the asset ASS etc. The values of the metadata entities may be determined in step 101 and provided as the metadata value. In another example, the asset ASS may be associated with a metadata file that comprises the metadata value; so, by reading the metadata file, the metadata value may be determined.

In case the asset ASS is a table of M columns, the metadata value may be provided as a tuple comprising the column values, the data class of the table, an abstract describing the table: {column1_name, column2_name, column3_name, . . . , columnM_name, table_name, table_class, table_abstract}. In case the asset ASS is a column, the metadata value may be provided as a tuple comprising the column value, the data class of the column, statistics of the column {column_name, column_class, column_statistics}. The statistics of the column may indicate the distribution of the values within the column, the range of values of the column, etc.

A set of characteristics of the metadata value of the asset ASS may be determined in step 103. This set of characteristics may be referred to as set of analysis characteristics. The set of analysis characteristics may, for example, comprise N analysis characters, where N≥1 or N≥2. The set of analysis characteristics may, for example, be user defined. For example, a user may be prompted in step 103 to provide the set of analysis characteristics, and in response to the prompting an input indicating the set of analysis characteristics may be received. Alternatively, or additionally, the set of analysis characteristics may automatically be selected as being all or part of the characteristics that are used by one or more metadata enrichment workflows. To provide indicative/useful set of analysis characteristics, features which may be known to be vital for the type of the present enrichment workflow may be used to determine the set of analysis characteristics. Thus, in one example, the set of analysis characteristics may be predicted by a machine learning model that is trained to receive as input a definition of the enrichment workflow and/or the metadata value of the analysis asset and to provide an estimate or prediction of the optimal set of analysis characteristics. The set of analysis characteristics may describe the properties of the metadata values. For example, the analysis characteristic of a column name may be the length of the string representing the column name. The analysis characteristic of a description such as an abstract may be the number of words in the description, the number stop words in the description etc.

At least one informativeness score $I_S$ of the metadata value of the asset ASS may be computed in step 105 using the set of analysis characteristics. $I_S$ may be a scalar or a vector of values. The informativeness score of the metadata value may indicate the level of information that is provided by the metadata value, which level of information may indicate whether an enrichment of the asset ASS based on a characteristic of the metadata value is efficient or not. FIGS. 2-5 provide examples of computation methods of the at least one informativeness score $I_S$.

Input characteristics of the multiple enrichment steps may be determined or identified in step 107. For example, the user may be prompted in step 107 to provide the input characteristics of the enrichment steps, and in response to the prompting an input indicating the input characteristics of the enrichment steps may be received. Alternatively, the code implementing the enrichment steps may be parsed to identify the input characteristics of the enrichment steps or a documentation of the enrichment steps may be used to determine the input characteristics of the enrichment steps.

For each enrichment step of the enrichment steps, the method steps 109 to 117 may be performed.

It may be determined in step 109 whether each input characteristic of the enrichment step is part of the set of analysis characteristics. In case, at least one input characteristic of the enrichment step is not part of the set of analysis characteristics, an execution of the enrichment step may not be performed or skipped in step 111.

In case all the input characteristic(s) of the enrichment step are part of the set of analysis characteristics, it may be determined based on the at least one informativeness score whether to adapt the enrichment step in step 113 according to the input characteristic and execute the adapted enrichment step in step 115 using as input the input characteristics or the enrichment step may be executed in step 117 using as input the input characteristics of the enrichment step without adapting the enrichment step.

In step 119, the labels resulting from the executed enrichment steps may be combined for providing one or more final labels of the asset ASS. For example, the execution of the enrichment steps may result in values of further metadata entities of the asset ASS. The values of the further metadata entities may be the labels. These labels may be combined by for example using all of them as final labels of the asset ASS. Alternatively, a subset of these labels may be selected and provided as final labels for the asset ASS. The selection may, for example, be performed by comparing the labels and selecting one label of each subset of two or more similar labels.

If, for example, all the enrichment steps of the workflow have to be skipped because all input characteristics are not part of the set of analysis characteristics, the method may go back to step 103 or step 101 in order to be repeated. This repetition may be performed until at least one enrichment step is not skipped.

Figure 2:
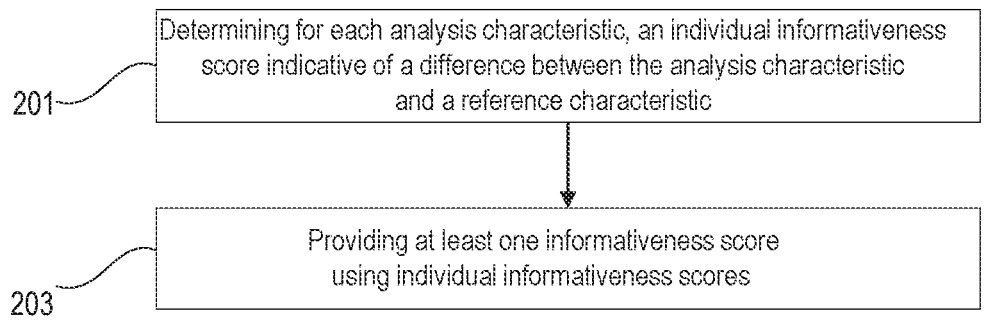
FIG. 2 is a flowchart of a method for determining an informativeness score of a data asset according to an example of the present subject matter.

FIG. 2 is a flowchart of a method for determining an informativeness score of a data asset according to an example of the present subject matter. The method of FIG. 2 may provide an example implementation of step 105 of FIG. 1.

An individual informativeness score may be determined in step 201 for each analysis characteristic of the set of analysis characteristics, e.g., which are determined in step 103 of FIG. 1. The individual informativeness score of a given analysis characteristic may be indicative of a difference between the given analysis characteristic and a reference value of the given characteristic. For example, $i_{s_1}^{chr}$ may be the individual informativeness score determined for the first character of the set of analysis characters, $i_{s_2}^{chr}$ is the individual informativeness score determined for the second character of the set of analysis characters, . . . , and $i_{s_N}^{chr}$ is the individual informativeness score determined for the last character of the set of analysis characters.

The at least one informativeness score $I_S$ may be provided in step 203 as comprising the individual informativeness scores as follows $I_S = \{i_{s_1}^{chr}, i_{s_2}^{chr}, \ldots, i_{s_N}^{chr}\}$. Alternatively, at least one informativeness score $I_S$ may be provided as a combination of the individual informativeness scores as follows $I_S = \text{comb}(i_{s_1}^{chr}, i_{s_2}^{chr}, \ldots, i_{s_N}^{chr})$, where comb(.) is the function that performs the combination. comb(.) is a combination function that combines the arguments provided for the function. The combination function may, for example, compute the average or the median of the individual informativeness scores $i_{s_1}^{chr}, i_{s_2}^{chr}, \ldots, i_{s_N}^{chr}$.

Figure 3:
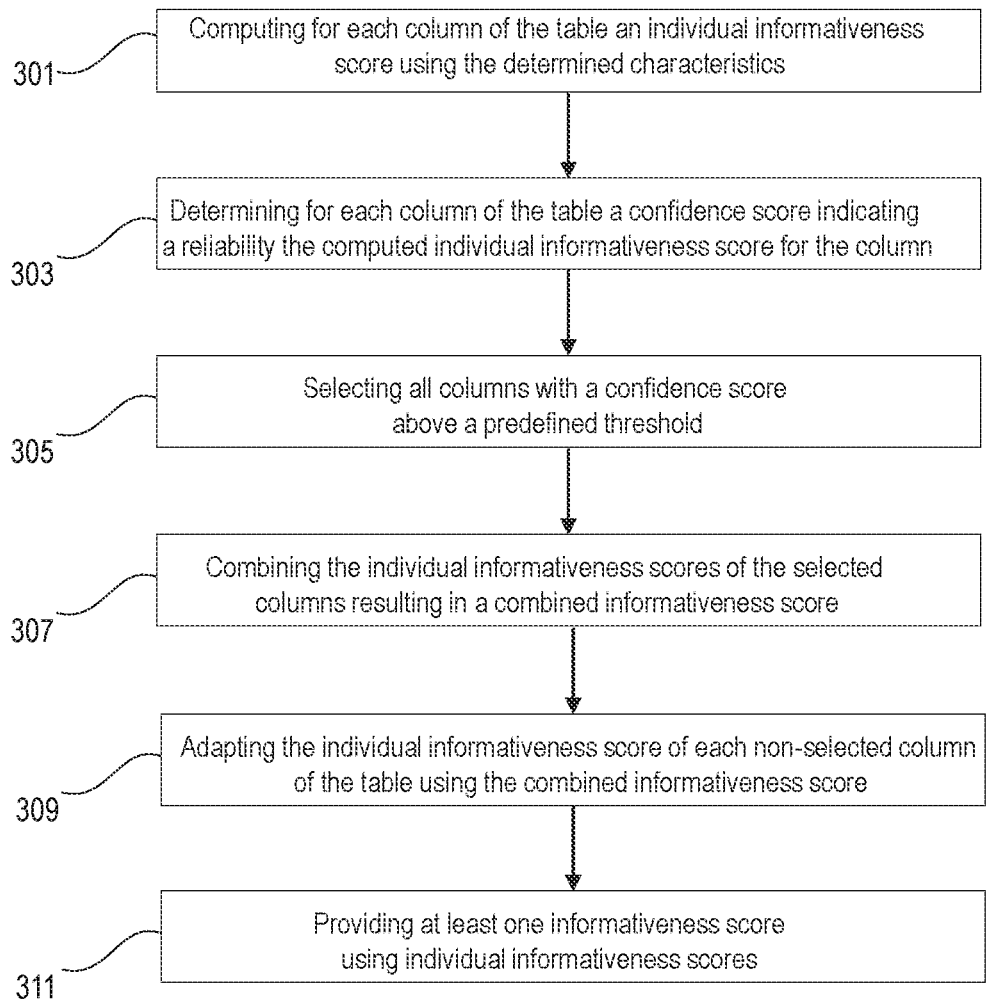
FIG. 3 is a flowchart of a method for determining an informativeness score of a data asset according to an example of the present subject matter.

FIG. 3 is a flowchart of a method for determining an informativeness score of a data asset according to an example of the present subject matter. The method of FIG. 3 may provide an example implementation of step 105 of FIG. 1 in case the asset ASS is a table having multiple columns, e.g., the asset ASS is a table has M columns.

An individual informativeness score may be determined in step 301 for each column of the table computing using the set of analysis characteristics e.g., as determined in step 103. This may result in the following M individual informativeness scores $i_{s_1}^{chr}, i_{s_2}^{chr}, \ldots, i_{s_M}^{chr}$.

A confidence score may be determined in step 303 for each column of the table, wherein the confidence score indicates a reliability of the computed individual informativeness score. This may result in the following M confidence scores $C_{s_1}^{clm}, C_{s_2}^{clm}, \ldots, C_{s_M}^{clm}$.

All columns of the table with a confidence score above a predefined threshold may be selected in step 305 (e.g., a number J of columns may be selected, where J<M). The individual informativeness scores of the selected columns may be combined (e.g., averaged) in step 307 resulting in a combined informativeness score. Assuming for example, the first J columns are the selected columns, the combined informativeness score CombS may be obtained as follows CombS=comb($i_{s_1}^{clm}, i_{s_2}^{clm}, \ldots, i_{s_J}^{clm}$), where comb(.) is the combination function as defined herein.

The individual informativeness score of each non-selected column of the table may be adapted in step 309 using the combined informativeness score. The first j individual informativeness scores $i_{s_1}^{clm}, i_{s_2}^{clm}, \ldots, i_{s_J}^{clm}$ may be maintained as they are. In one example, the non-selected columns may be assigned the individual informativeness scores as follows: $i_{s_{J+1}}^{clm}$=CombS, $i_{s_{J+2}}^{clm}$=CombS, ..., $i_{s_M}^{clm}$=CombS, meaning that the combined informativeness score is assigned to each non-selected column. Alternatively, for each non-selected column, a weighted sum of the combined informativeness score CombS and the individual informativeness score $i_{s_k}^{clm}$ (where k varies between J+1 and M) of the non-selected column and the weighted score may be assigned to the non-selected column as the individual informativeness score of the non-selected column. For example, $i_{s_{J+1}}^{clm}$=wsum(CombS, $i_{s_{J+1}}^{clm}$), $i_{s_{J+2}}^{clm}$=wsum(CombS, $i_{s_{J+2}}^{clm}$), ..., $i_{s_M}^{clm}$=wsum(CombS, $i_{s_M}^{clm}$), where wsum(.) refers to a function that performs the weighted sum e.g., as follows wsum(a, b)=$w_a \cdot a + w_b \cdot b$, where $w_a$ and $w_b$ are predefined weights e.g., user defined weights.

The at least one informative score may be provided in step 311 as comprising the resulting individual informativeness scores of the columns e.g., as follows: $I_S = \{i_{s_1}^{clm}, i_{s_2}^{clm}, \ldots, i_{s_M}^{clm}\}$.

Figure 4:
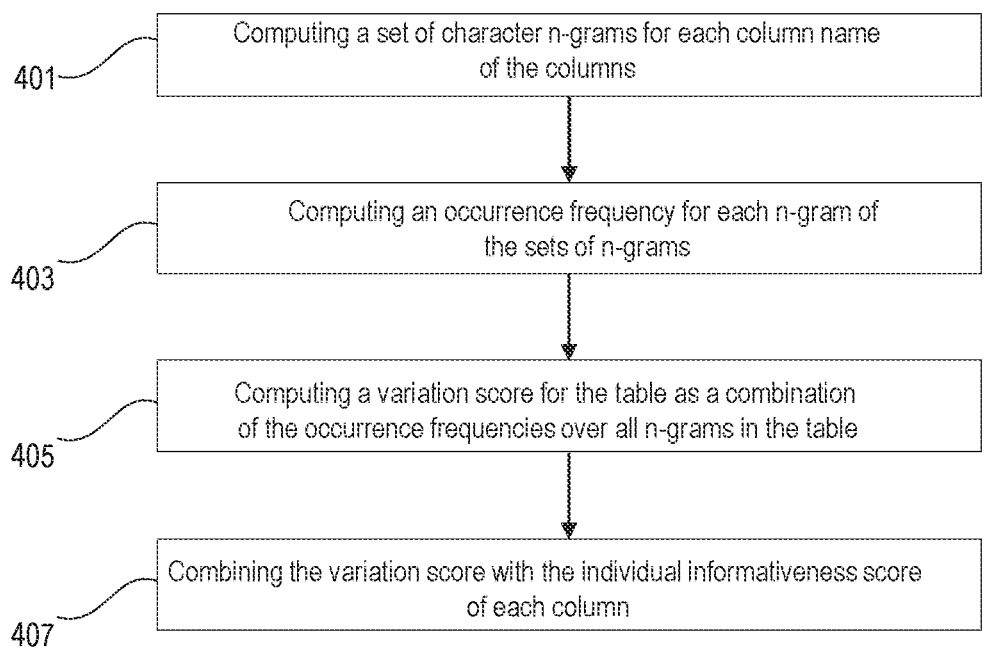
FIG. 4 is a flowchart of a method for determining an informativeness score of a data asset according to an example of the present subject matter.

However, if none of the columns of the table can be selected because all confidence scores are smaller than the predefined threshold, the informativeness scores obtained in FIG. 4 may be used as informativeness scores of the columns of the table. Alternatively, the method may be repeated with a different set of analysis characteristics until one or more columns are selected based on their confidence scores.

FIG. 4 is a flowchart of a method for determining an informativeness score of a table according to an example of the present subject matter. The method of FIG. 4 may provide an example implementation of step 105 of FIG. 1 in case the asset ASS is a table having multiple columns, e.g., the asset ASS is a table has M columns and that the metadata value is the names of the M columns. The method of FIG. 4 may, for example, use one or more results of the method of FIG. 3.

A set of character n-grams may be computed in step 401 for each column name of the column names. This may result in M sets of n-grams. An occurrence frequency for each n-gram in the sets of n-grams may be computed in step 403, e.g., as the percentage of the columns in which it occurs. In order to compute the occurrence frequency, an optional advantageous pre-processing may be performed. As an optional pre-processing step, the beginning and end of the set of n-grams may be marked with a marker like "$" to distinguish initial and terminal n-grams. As an additional or alternative optional pre-processing step, all digits may be replaced with another marker like % to treat them as one character. E.g., for a metadata value comprising the names COL_1 and N-2 this would result in the set of n-grams {$C, CO, L_, _%, %$}.

A variation score $V_S$ may be computed in step 405 for the whole table ASS as a combination of the occurrence frequencies over all n-grams in the table ASS. For example, for the table having column names COL_1, COL_2, COL_3 the percentage would be 100% i.e., 1.0 for each of the n-grams in {$C, CO, L_, _%, %$}.

The variation score may be combined in step 407 with the individual informativeness score of each column as determined in FIG. 3. For example, the new individual informativeness scores of the M columns may be obtained as follows: $i_{s_k}^{clm}$=comb($V_S, i_{s_k}^{clm}$), where k varies between 1 and M.

In case no column has a confidence score higher than the predefined threshold, the variation score $V_S$ may be used as an individual informativeness score of each column of the columns e.g., $i_{s_k}^{clm} = V_S$, where k varies between 1 and M.

Figure 5:
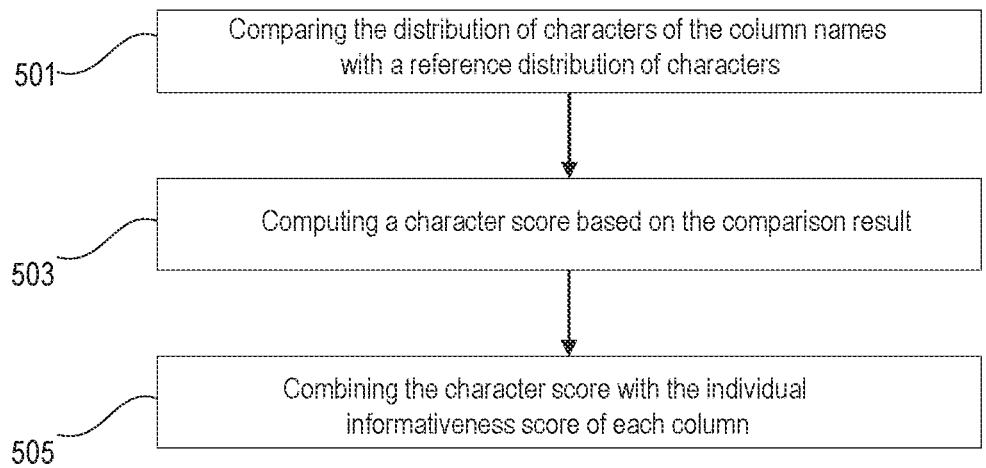
FIG. 5 is a flowchart of a method for determining an informativeness score of a data asset according to an example of the present subject matter.

FIG. 5 is a flowchart of a method for determining an informativeness score of a table according to an example of the present subject matter. The method of FIG. 5 may provide an example implementation of step 105 of FIG. 1 in case the asset ASS is a table having multiple columns, e.g., the asset ASS is a table has M columns and that the metadata value is the names of the M columns. The method of FIG. 4 may, for example, use one or more results of the method of FIG. 3.

The distribution of characters of the column names may be compared in step 501 with a reference distribution of characters. A character score ($CHR_S$) may be computed in step 503 based on the comparison result. The character score may be combined in step 505 with the individual informativeness score of each column of the table as follows: $i_{s_k}^{clm}$=comb($CHR_S, i_{s_k}^{clm}$), where k varies between 1 and M.

The method of FIG. 5 may provide another metric that can be used to compare the distribution of characters as found in the column names with the distribution of characters which is typical for a language like English, or which is computed from a list of terms as found in a glossary. The idea may be that the frequency of characters or sequence of characters and the variance of this frequency among the different possible characters composing asset names may be a signature which can be used to differentiate different languages from each other. If algorithm generated names are considered as a kind of language of its own, it would present a different signature than names based on the English language for instance. Using that logic on a single column name may not be accurate enough because a single column name may be too short to be statistically representative. But when using all column names of the same asset together, it may give a much more significant signature which can be compared to the signature that may be obtained from English words. With the English language, a frequency may be higher for certain letters like "A" "E" "M" and "L" and lower for letters like "X" "Z" and "K", and thus a generated name may show a distribution where either a few letters are used, or the frequency between the letters show far less variation.

Figure 6:
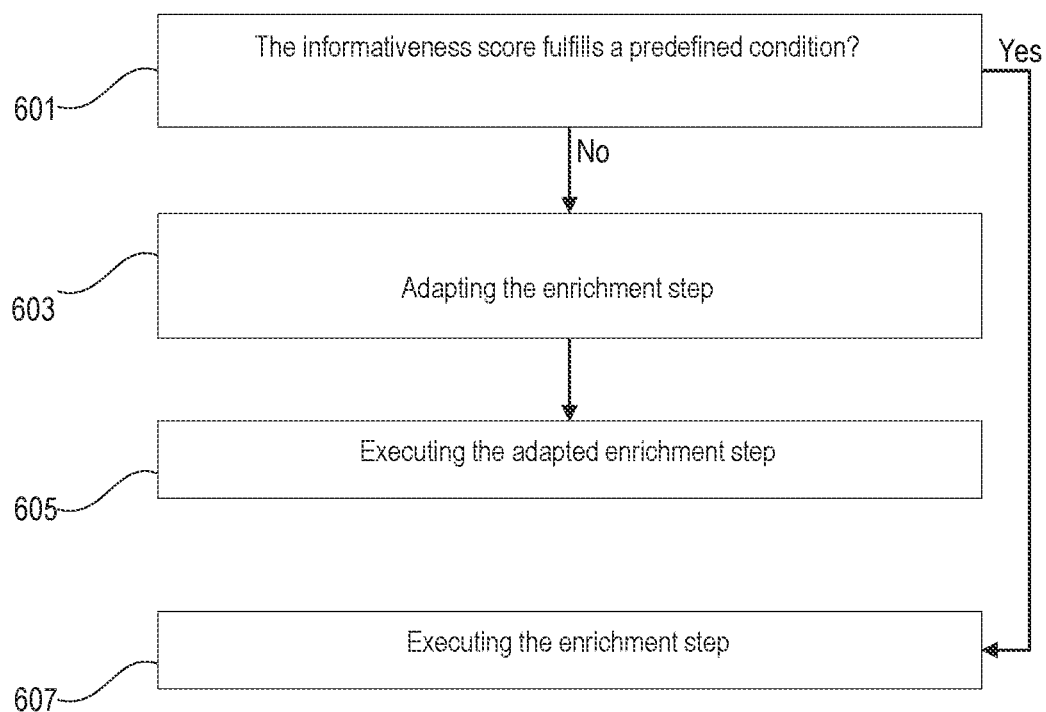
FIG. 6 is a flowchart of a method for executing an enrichment step using the informativeness score according to an example of the present subject matter.

FIG. 6 is a flowchart of a method for executing an enrichment step using the informativeness score according to an example of the present subject matter.

It may be determined in step 601 whether the at least one informativeness score $I_S$ of the asset ASS (e.g., $I_S$ may be determined with the method of FIG. 2, 3, 4 or 5) fulfills a predefined condition. The predefined condition may, for example, requires that each score of the at least one informativeness score $I_S$ is higher than a threshold.

In case the at least one informativeness score $I_S$ of the asset ASS fulfills the predefined condition, the enrichment step may be executed (as it is) in step 607. In case the at least one informativeness score $I_S$ of the asset ASS does not fulfill the predefined condition, the enrichment step may be adapted in step 603 and the adapted enrichment step may be executed in step 605.

Figure 7:
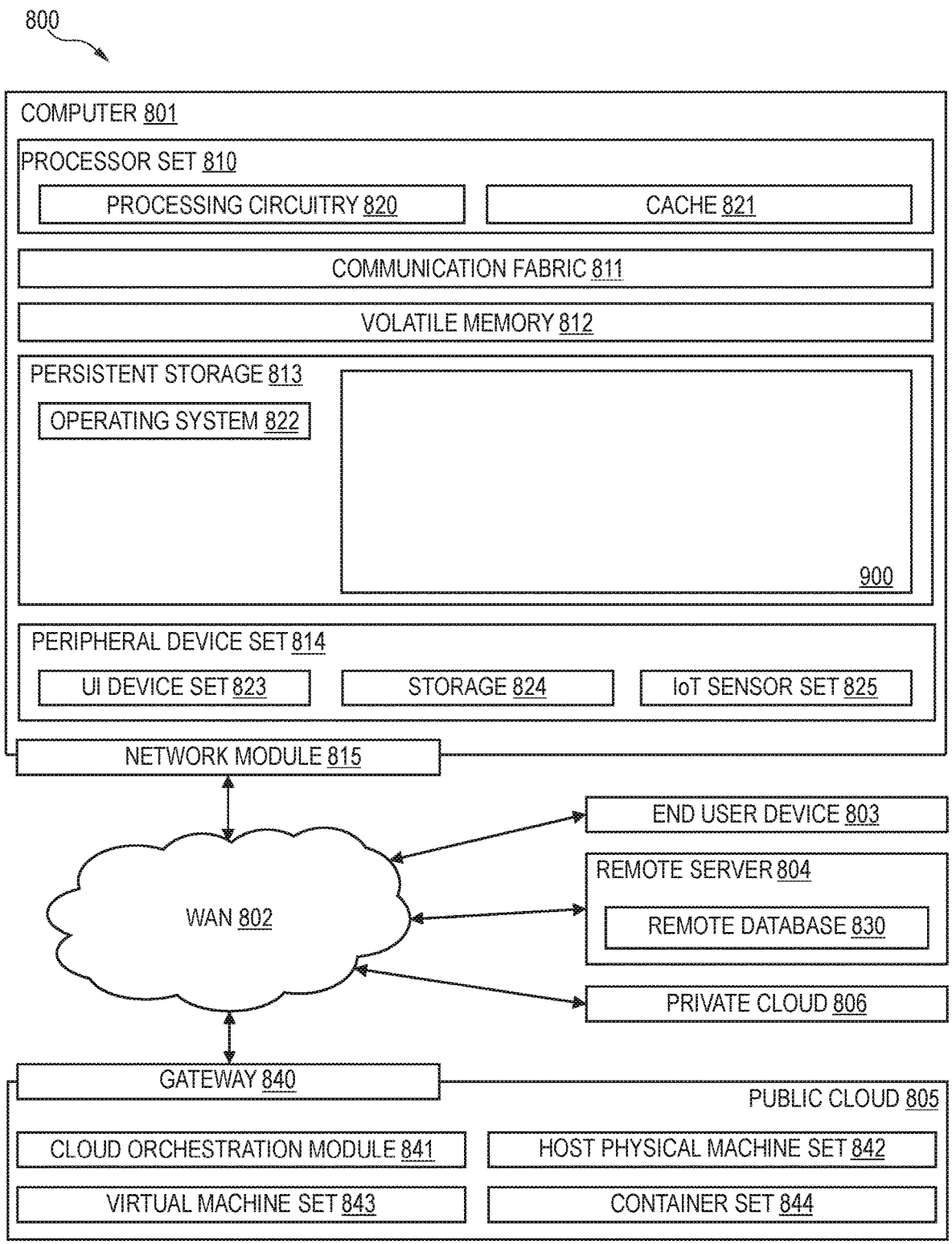
FIG. 7 is a computing environment in accordance with an example of the present subject matter.

FIG. 7 is a computing environment in accordance with an example of the present subject matter.

Computing environment 800 contains an example of an environment for the execution of at least some of the computer code involved in performing the inventive methods, such as a metadata enrichment code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 7. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip."

In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method comprising:
   determining, by one or more computer processors, for an input data asset of a relational database system, a metadata value descriptive of the input data asset, wherein the metadata value comprises a tuple having three entries including a column name, a file name, and a data class;
   determining, by one or more computer processors, characteristics of the metadata value of the input data asset using a machine learning model, wherein the machine learning model receives, as input, a definition of an enrichment workflow and the metadata value;
   computing, by one or more computer processors, at least one informativeness score of the metadata value of the input data asset using the determined characteristics, wherein:
   the at least one informativeness score indicates a level of information that is provided by content of the metadata value; and
   the at least one informativeness score indicates that the column name is computer-generated and that a semantic comparison with real language terms is precluded;
   determining, by one or more computer processors, input characteristics of enrichment steps by parsing code implementing the enrichment steps;
   for each step of the enrichment steps:
      determining, by one or more computer processors, that the input characteristic of the enrichment step is part of the determined characteristics; and
      responsive to determining that the input characteristic of the enrichment step is part of the determined characteristics, executing, by one or more computer processors, the enrichment step using the input characteristic as input, based on the at least one informativeness score; and
   labeling, by one or more computer processors, the data asset with a combination of labels resulting from the executed enrichment steps, wherein the combination of labels describe the data asset.

2. The computer-implemented method of claim 1, wherein a label of the metadata value comprises at least one of a selection from the group consisting of: a term descriptive of the metadata value and a class of the data asset.

3. The computer-implemented method of claim 1, further comprising:
   determining, by one or more computer processors, that the at least one informativeness score fails to fulfill a predefined condition; and
   responsive to determining that the at least one informativeness score fails to fulfill the predefined condition, performing, by one or more computer processors, adaptation of the enrichment steps.

4. The computer-implemented method of claim 1, further comprising:
   for each determined characteristic of the characteristics, determining, by one or more computer processors, an individual informativeness score indicative of a difference between the determined characteristic and a reference characteristic, wherein the at least one informativeness score comprises a selection from the group consisting of: the individual informativeness scores and the at least one informativeness score being a combination of the individual informativeness scores.

5. The computer-implemented method of claim 1, wherein the at least one informativeness score comprises an individual informativeness score per determined characteristic, further comprising:
   determining, by one or more computer processors, that at least one of the individual informativeness scores of the input characteristics of the enrichment step fails to fulfill a predefined condition; and
   responsive to determining that at least one of the individual informativeness scores of the input characteristics fails to fulfill the predefined condition, performing, by one or more computer processors, adaptation of the enrichment steps.

6. The computer-implemented method of claim 4, wherein the at least one informativeness score is a combined informativeness score, further comprising:
   determining, by one or more computer processors, that the combined informativeness score fails to fulfill a predefined condition; and responsive to determining that the combined informativeness score fails to fulfill the predefined condition, performing, by one or more computer processors, adaptation of the enrichment steps.

7. The computer-implemented method of claim 1, the data asset comprising at least one of a selection from the group consisting of: one or more tables of a database, one or more columns of a table, and one or more files of a file system.

8. The computer-implemented method of claim 1, the metadata value comprising a selection from the group consisting of: a name of the data asset, a description of the data asset, a class of the data asset, and data statistics of the data asset.

9. The computer-implemented method of claim 1, the characteristics comprising at least one of a selection from the group consisting of: capitalization of the metadata value, length of the metadata value, language of the metadata value, availability of the metadata value, number of non-stop-words of the metadata value, sequence patterns in the metadata value, prefix sequences in the metadata value, postfix sequences in the metadata value, abbreviations in the metadata value, and dictionary words in the metadata value.

10. The computer-implemented method of claim 1, the data asset comprising a table having columns, wherein:
the metadata value of the table comprises one or more features descriptive the column of the table;
computing at least one informativeness score of the metadata value of the input data asset using the determined characteristics comprises:
for each column of the table, computing, by one or more computer processors, an individual informativeness score using the determined characteristics and determining a confidence score indicating a reliability the computed individual informativeness score;
selecting, by one or more computer processors, all columns with a confidence score above a predefined threshold;
combining, by one or more computer processors, the individual informativeness scores of the selected columns, resulting in a combined informativeness score; and
adapting, by one or more computer processors, the individual informativeness score of each non-selected column of the table using the combined informativeness score; and
the at least one informative score comprises the individual informativeness scores of the columns.

11. The computer-implemented method of claim 10, wherein combining the individual informativeness scores comprises a selection form the group consisting of averaging the individual informativeness scores and computing a median of the individual informativeness scores.

12. The computer-implemented method of claim 10, wherein adapting the individual informativeness score of the non-selected column comprises assigning, by one or more computer processors, the combined informativeness score to the column.

13. The computer-implemented method of claim 10, wherein adapting the individual informativeness score of the non-selected column comprises:
computing, by one or more computer processors, a weighted sum of the combined informativeness score and the individual informativeness score of the column; and
assigning, by one or more computer processors, the weighted score to the column as the individual informativeness score of the column.

14. The computer-implemented method of claim 10, the metadata value of the data asset comprising names of the columns of the table, further comprising:
for each column name of the column names, computing, by one or more computer processors, a set of character n-grams;
computing, by one or more computer processors, an occurrence frequency for each n-gram of the sets of n-grams;
computing, by one or more computer processors, a variation score for the table as a combination of the occurrence frequencies over all n-grams in the table; and
performing, by one or more computer processors, a selection from the group consisting of: (i) combining the variation score with the individual informativeness score of each column, thereby obtaining the individual informativeness score of the column and (ii) responsive to no column having a confidence score higher than the threshold, using the variation score as an individual informativeness score of each column of the columns.

15. The computer-implemented method of claim 10, the metadata value of the data asset comprising names of the columns of the table, further comprising:
comparing, by one or more computer processors, distribution of characters of the column names with a reference distribution of characters;
computing, by one or more computer processors, a character score based on the comparison; and
combining, by one or more computer processors, the character score with the individual informativeness score of each column to obtain the individual informativeness score of the column.

16. The computer-implemented method of claim 1, wherein each enrichment step of the workflow uses a classification algorithm that is configured to receive the metadata value as input and to provide one or more labels as output.

17. The computer-implemented method of claim 1, further comprising:
training, by one or more computer processors, the machine learning model to:
receive, as input, a definition of the enrichment workflow and the metadata value of the input data asset; and
provide a prediction of the characteristics.

18. A computer program product comprising:
one or more computer-readable storage media; and
program instructions stored on the one or more computer-readable storage media to perform operations comprising:
determining, for an input data asset of a relational database system, a metadata value descriptive of the input data asset, wherein the metadata value comprises a tuple having three entries including a column name, a file name, and a data class;
determining characteristics of the metadata value of the input data asset using a machine learning model, wherein the machine learning model receives, as input, a definition of an enrichment workflow and the metadata value;
computing at least one informativeness score of the metadata value of the input data asset using the determined characteristics, wherein:

the at least one informativeness score indicates a level of information that is provided by content of the metadata value; and the at least one informativeness score indicates that the column name is computer-generated and that a semantic comparison with real language terms is precluded;

determining input characteristics of enrichment steps by parsing code implementing the enrichment steps;

for each step of the enrichment steps:

determining that the input characteristic of the enrichment step is part of the determined characteristics; and responsive to determining that the input characteristic of the enrichment step is part of the determined characteristics, executing the enrichment steps using the input characteristic as input, based on the at least one informativeness score; and labeling the data asset with a combination of labels resulting from the executed enrichment steps, wherein the combination of labels describe the data asset.

19. A computer system comprising:

a processor set;

one or more computer-readable storage media; and program instructions stored on the one or more computer-readable storage media to cause the processor set to perform operations comprising:

determining, for an input data asset of a relational database system, a metadata value descriptive of the input data asset, wherein the metadata value comprises a tuple having three entries including a column name, a file name, and a data class;

determining characteristics of the metadata value of the input data asset using a machine learning model, wherein the machine learning model receives, as input, a definition of an enrichment workflow and the metadata value;

computing at least one informativeness score of the metadata value of the input data asset using the determined characteristics, wherein:

the at least one informativeness score indicates a level of information that is provided by content of the metadata value; and the at least one informativeness score indicates that the column name is computer-generated and that a semantic comparison with real language terms is precluded;

determining input characteristics of enrichment steps by parsing code implementing the enrichment steps;

for each step of the enrichment steps:

determining that the input characteristic of the enrichment step is part of the determined characteristics; and responsive to determining that the input characteristic of the enrichment step is part of the determined characteristics, executing the enrichment steps using the input characteristic as input, based on the at least one informativeness score; and labeling the data asset with a combination of labels resulting from the executed enrichment steps, wherein the combination of labels describe the data asset.

* * * * *